Sept. 9, 1969  J. A. DAWSON  3,466,066
PRESS-FIT CONNECTION FOR FLUID COUPLINGS AND STRUCTURES
Filed June 19, 1967  2 Sheets-Sheet 1
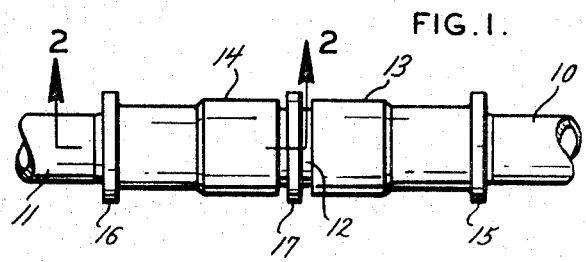
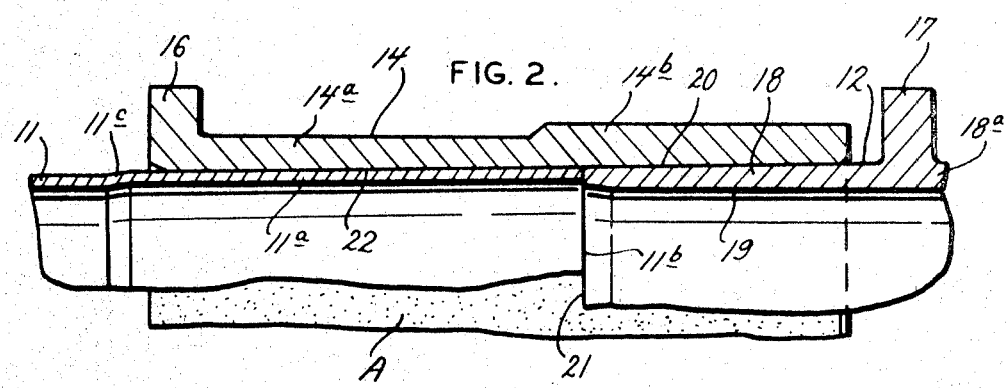
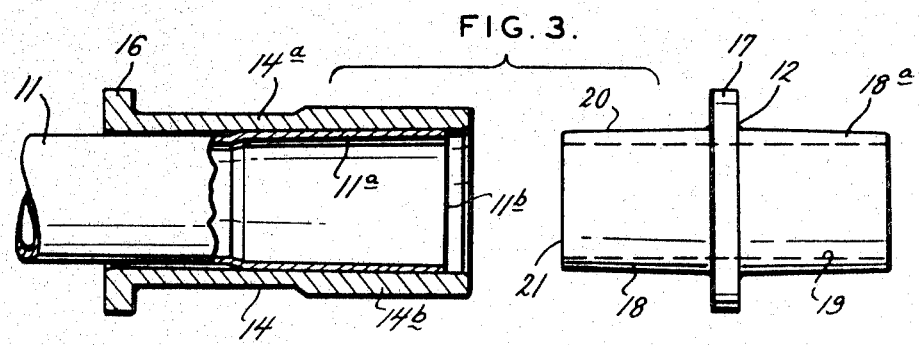
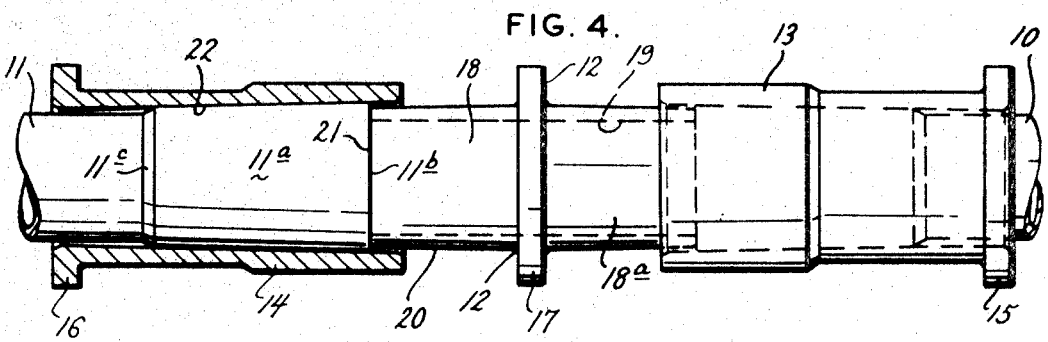
INVENTOR
JAMES A. DAWSON
BY Gravely, Lieder & Woodruff
ATTORNEYS Sept. 9, 1969  J. A. DAWSON  3,466,066
PRESS-FIT CONNECTION FOR FLUID COUPLINGS AND STRUCTURES
Filed June 19, 1967  2 Sheets-Sheet 2
FIG. 5.
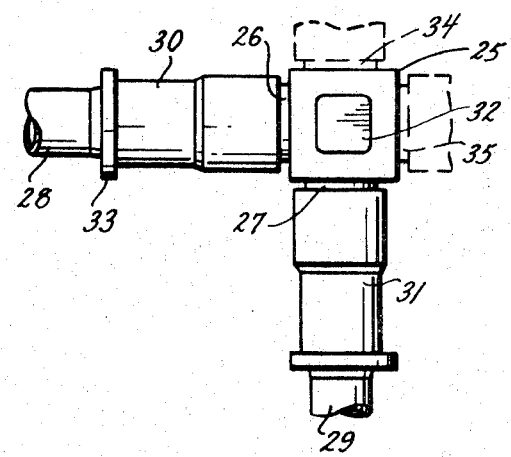
FIG. 6.
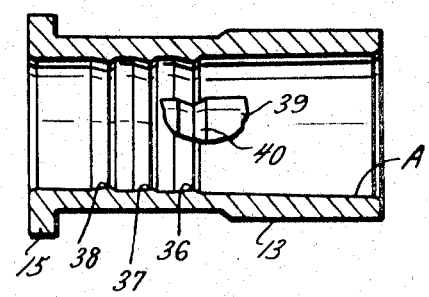
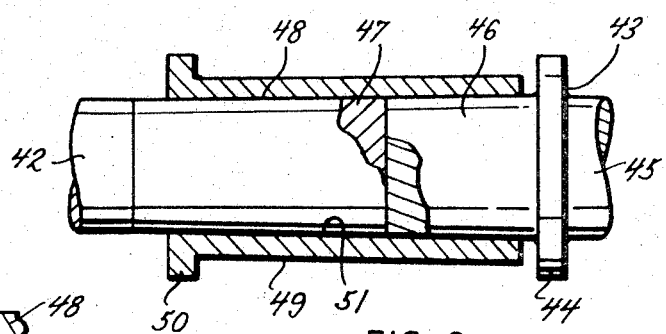
FIG. 7.
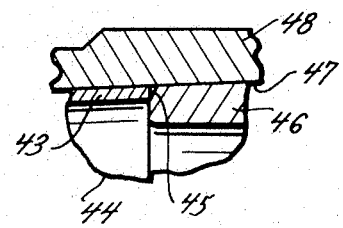
FIG. 8.
INVENTOR
JAMES A. DAWSON
BY Gravely, Leeder & Woodruff
ATTORNEYS

United States Patent Office 3,466,066
Patented Sept. 9, 1969

3,466,066
PRESS-FIT CONNECTION FOR FLUID
COUPLINGS AND STRUCTURES
James A. Dawson, Hazelwood, Mo., assignor to McDonnell Douglas Corporation, St. Louis County, Mo., a corporation of Maryland
Filed June 19, 1967, Ser. No. 646,816
Int. Cl. F16l 35/00, 21/00
U.S. Cl. 285—39       9 Claims

ABSTRACT OF THE DISCLOSURE

A press-fitted connection for fluid couplings and structures such as connecting tension rods or tubes in a fluid system, in which rod to rod or tube to tube connection is made by mating the taper of a body part to that of the rod or tube and applying a sleeve for connecting the rod or tube to the body without reliance upon threads or similar mechanical means to retain the connected rods or tubes united in a structural assembly.

---

This invention relates to a new type of press-fitted connection for fluid couplings and structural assemblies such as joining tension rods or forming tube joints in fluid systems, and is particularly concerned with eliminating the problems inherent in brazed fittings, welded fittings, and the usual flared formations and threaded-together parts of conventional joints in such assemblies.

A problem almost universally encountered in making secure, leak-proof tube joints in fluid couplings is that there is uncertainty in the perfection with which the deep tube flares and flareless "bite-type" joints can be formed without nicking, scratching or in other ways subjecting the tube end to a physical condition that may result in rupture or failure. It is also a problem in rod to rod or tube to tube connections of the type heretofore referred to, to reach torque values of threaded-together parts that will be adequate and still not damage the rod or tube ends being connected. Where brazing or welding is relied upon to effect the connections, weakening occurs in the heat-affected zone. Furthermore, a brazed or welded connection is usually not capable of visual inspection and this introduces the additional expense of subjecting the joints to X-ray inspection and analyzing the inert gas atmosphere for adequacy. Numerous other problems are known to exist with the types of joints which prevail at the present time.

It is, therefore, an important object of this invention to provide a unique and new connection for structural assembly of rods, or fluid couplings and the like; that will overcome the major problems heretofore encountered.

It is an important object of this invention to provide a new and unique connection which relies upon press-fitted assembly of the parts wherein a compact pressure-applying tool provides reliable, consistent assembly and disassembly without imparting objectionable torque or stress in the connection.

It is another object of the present invention to provide a press-fitted connection for rods or conduits that will be permanent and easily inspected yet may be disconnected and reused.

Yet another object of the present invention is to provide a new and unique connection for conduits that will withstand considerable pressure and will retain its secure connection under severe vibration conditions.

A further object of the present invention is to provide a unique press-fit connection for structural rods or fluid couplings that will offer a substantial weight reduction advantage, require less space consumption, permit use of relatively small diameter stock or thin wall but high strength tubing, can be manufactured without stringent requirements for preassembly surface preparations, does not require the usual installation clearance length allowances, and is much cheaper to manufacture and assemble with less likelihood of error.

Yet another object of the present invention is to provide a new and unique connection principle which may be reliably adapted to tension assemblies of rods or to higher pressure and temperature conditions than normally used for fluid couplings in pressurized fluid systems.

Further and additional objects and advantages for this invention will be hereinafter set forth in connection with certain preferred embodiments which will be described in the following specification, reference being made to the accompanying drawings, wherein:

FIG. 1 is a fragmentary view of a fluid system at a typical press-fitted connection which embodies the subject matter of this invention;

FIG. 2 is a greatly enlarged fragmentary sectional view taken at line 2—2 in FIG. 1;

FIG. 3 is a fragmentary sectional exploded view of the components making up one-half of the press-fitted connection shown in FIG. 1;

FIG. 4 is a partially exploded view, in fragmentary sectional elevation, of the components of the present press-fit connection for conduits, aligned and ready for assembly;

FIG. 5 is a fragmentary view of an embodiment of the present invention as applied to elbow, T, and cross fittings;

FIG. 6 is a sectional elevational view of a fitting sleeve and a fragmentary portion of a burnishing tool, the view showing annular rings in exaggerated proportion;

FIG. 7 is a fragmentary sectional view of means for establishing an abutment between the fluid carrying conduit and the body of the fitting so as to form a secondary (redundant) seal; and FIG. 8 is a fragmentary sectional view, similar to FIG. 7 but showing one half of a press-fit connection for structural rods.

Turning now to FIG. 1, it can be seen that the fluid carrying system includes conduits 10 and 11 which are required to be connected at their adjacent ends by means of a fitting body 12 and a pair of sleeve members 13 and 14. The sleeves are provided respectively with assembly flanges 15 and 16 and the fitting body 12 is also provided with a flange 17. Thus, in effecting the assembly of the end of tube 10 to the body 12, compression pressure can be exerted on the sleeve flange 15 and the body flange 17, causing the sleeve 13 to move left on body 12 thereby gripping tube and body. Similarly, in effecting the connection for the end of tube 11, compression force can be applied between the sleeve flange 16 and the body flange 17. This will be more apparent from the following detailed description.

Turning now to FIGS. 2 and 3, it can be observed that the body 12 has a tubular extension 18 with an internal bore 19 that may be cylindrical or tapered to match the outer surface 20 which is tapered toward the outer end 21 from the flange 17. The sleeve 14 is formed with an internal bore 22 that is tapered throughout its axial length to match the taper on the body surface 20. The tube 11 is provided with an end portion 11a that is tapered between its outer end 11b and the area denoted 11c. The taper on this portion of the tube 11 may be formed by the use of a tapered mandrel, by internal pressure, or by other means. The sleeve member 14 must be mounted on the tube 11 before the end 11a is outwardly tapered (as distinguished from a flare). It is preferred to utilize the internal tapered surface 22 of the sleeve 14 as the form for dictating the formation of the taper 11a on the tube 11. This, therefore, makes the sleeve 14 a forming die for the tapering of the end of the tube 11. Tube springback after forming permits handtight positioning of sleeve 14 beyond tube end 11b for concentric alignment with body end 21 prior to assembly, as shown in FIG. 4.

The manner of assembly is shown in FIG. 3 and FIG. 4, and attention will be directed to FIG. 3 where in the initial positioning of the sleeve 14 on the tapered end 11a of the tube 11 it is noted that the large diameter end of the sleeve 14 may extend beyond tube end 11b for aiding alignment when body 12 is brought into position such that its end 21 abuts the end 11b of tube 11. Compression pressure is then exerted between the sleeve flange 16 and the body flange 17 so as to cause the extension 18 on the body 12 to ram the tube 11 into the tapered bore 22 of the sleeve 14 and place tube taper 11a and body extension 18 in radial compression within sleeve 14. This ramming action may be continued until the large diameter end of the sleeve 14 is slightly spaced from the flange 17 on the body 12 (see FIG. 1), thereby leaving a gap for visual inspection. FIG. 4 also shows the assembly of the tube 10 to the body 12 by means of the body extension 18a being inserted in the large diameter end of the sleeve 13. Disassembly is obtained by reversing the direction of force application.

In connection with the assembly shown in FIGS. 2 and 3, it clearly appears that the sleeve 14 has two different wall thicknesses. Although this feature is not essential, it does reduce the weight to some extent. The thickness of the wall part 14a may differ from the thickness of the wall part 14b by being approximately twice the thickness of the wall of the part mated therewithin. For example, sleeve wall part 14a has a thickness approximately twice that of the thickness of the tube wall 11a, and sleeve part 14b has a wall thickness approximately twice that of the thickness of the body extension 18. It is preferred, but not essential, to stay near a double thickness or double strength ratio in order to avoid excessive tensile stress in the sleeve and possible aging failure. It is also desirable to minimize the sleeve wall thickness in order to reduce the overall weight and size of the connection, and in this respect the sleeves may have a stepped wall section so as to coincide with any change in strength and wall thicknesses between the body extension 18 and the tube end 11a. What has been described in FIG. 2 for sleeve 14 will be similar for sleeve 13.

In connection with the assembly shown in FIG. 2 it is pointed out that a feature of the present invention is to apply a coating or plating of material A on the internal tapered surface 22 of the sleeve 14, and on the external tapers of body extensions 18 and 18a. This will also apply to the interior surface of sleeve 13. As optional variations, said platings may also be applied to tube taper 11a, or to any combination of the parts. The coating or plating material may be silver, aluminum, nickel, or other material which may be smoothed and compressed by burnishing at the same time the sleeve is being sized according to tolerance requirements for the tube 10 or 11 that is to be connected. The material A may be applied as an over all or partial surface coating, and it may be smooth or formed in annular rings as shown in FIG. 6. Said annular rings of material will improve the sealing effect and increase stress concentration at assembly so that fusion or better bonding is obtained between the mating surfaces of the assembly as shown in FIG. 2. Other coating materials which may be utilized as lubricant, seal, or bonding agent, or combinations thereof, include Teflon, Kel-F, Dow No. 4 silicone, graphite, petrolatum, molydisolfide, Loctite, MIL-H-5606 hydraulic fluid, and other hydraulic fluids as used in control systems. With any of these other designated materials, the grip or bond is governed primarily by the friction between the sleeve, tube and body of the connection. The material utilized has a tendency to effectively disappear as the tube and body approach the yield point in compression. It is of significance that the bond or grip achieved is due largely but not completely to coating type and amount, material selections and heat treating, taper, dimensional control, grip length, and surface finishes. The degree of bonding of the parts of the connection may be controlled by adjusting these and other parameters.

The most successful results have been achieved with silver, aluminum, and nickel as the coating material. These metals are relatively soft and have moderate melting temperature levels. The coating materials of metal are essentially pure, however alloys and combinations can be utilized to obtain varying characteristics, such as hardness and strength. The application of the coating material may be by chemical bonding of the plating material to the parent metal. Mechanical bonding gives good results but chemical or metallurgical bonding is preferred. As is disclosed herein, annular ring formations can be formed in the plating or coating material. The function of the ring formations is to obtain higher stress concentration and more dense coating due to the burnishing tool. It is also desired for the purpose of increasing stress on the raised annular rings, thereby increasing the depth of penetration of the coating material into the irregular surfaces of the mating parts. The annular ring formation also increases the rise in temperature in the plating material during assembly, due to the higher stress concentration, and this improves the bonding.

Turning now to FIG. 5, it is seen that an elbow fitting 25 is formed with outwardly directed tapered extensions 26 and 27 for supporting the connection of tubes 28 and 29 respectively by means of assembly sleeves 30 and 21 respectively. The manner of tapering the ends of the tubes 28 and 29 and of using the tapered bore of the sleeves 30 and 31 for this purpose is similar to that described in connection with FIG. 2. The compression assembly of the fitting 25, tube 28 and sleeve 30 is performed by having the jaws of a compression tool (not shown) engaged on oppositely directed projections 32 on the fitting body 25 and the flange 33 on the sleeve 30. In order to obtain symmetrical compression loading the fitting 25 is provided with oppositely directed extensions 32, but only one is shown in FIG. 5. Also, as shown in FIG. 5 for purpose of illustration, the elbow fitting when provided with extensions 34 and 35 (as shown in broken outline) will illustrate the application of the present invention to a crossfitting where four conduits come together. It is observed that other types of fittings may be adapted to the present invention. Bulkhead fittings, adapter fittings, and fittings of other types may be designed with the basic press-fit concept.

Turning now to FIG. 6 there is shown a modification in connection with the coating or plating of the surfaces of the instant connection. Specifically this view is of sleeve 13 (FIG. 1) which has been plated with material A on its internal surface at desired places. In the internally applied material A there is formed a series of raised annular formations 36, 37 and 38. These annular raised portions are formed upon the application of a burnishing tool 39 to the material A. As is shown in fragmentary elevation, the burnishing tool 39 is formed with annular grooves, one of which is at 40. When the burnishing tool is inserted in the sleeve the grooves force the material A to conform to the surface of the burnishing tool 39. Hence the annular rings 36, 37 and 38 in the material A will result. The configuration of the rings 36, 37 and 38 will be approximately that of a sawtooth. Annular rings may also be formed on the sleeve inner surface if no plating is employed.

In FIG. 7 there is shown a modified arrangement wherein the tapered end 43 of a tube 44 may have a sealed abutment with the chamfer 45 on the outer end of the body extension 46, the body and tube being, of course, retained in the tapered bore 47 of an assembly sleeve 48. In effecting the assembly of the parts shown in FIG. 7 a suitable compression loading may be applied on the tube end 43 as previously described for fittings in FIGURES 1 through 5, to force the end thereof, which may be of the same, or softer, or harder material than the material of body extension 46, against the chamfer 45 on the body extension. This will cause the material of the tube end 43 or body end 46, or both, to yield and form a seal, and will cause the tube end 43 to more tightly grip the tapered bore 47 of the sleeve 48 so that a better seal is obtained.

Turning now to FIG. 2 there has been briefly described above the application of a plating material A to the inner tapered bore 22 of the sleeve 14. The plating material is intended to act as a lubricant between the higher strength parent metals in sleeve, body and tube. The material A is also applied to assist in the formation of a leak proof abutment between the assembled parts, as well as to make it possible to disassemble the fitting without resorting to destroying any of the components. The material A is selected for its relatively soft characteristics and because its bonding tendency may be improved by the heat generated during the compression assembly of the components. If the compression assembly force applied on flanges 16 and 17 (FIG. 2) is limited to a short period of time so that the body 12 and sleeve 14 are brought into final assembled position quickly, there will be sufficient heat generated in the material A to soften or melt and aid in fusing this material between the sleeve and body extension. If the thickness of the plating or coating material A is sufficient there will be a shearing action set up within the thickness of the material A between sleeve and body so that disassembly of the parts can be accomplished without destructive effect thereon. A number of cycles of assembly and disassembly can be obtained without stringent cleaning or appreciable degradation to the components of the fitting and without seriously impairing the sealing characteristics thereof. Typical platings or coating materials have been applied to sleeves, bodies, and tubing in thicknesses up to and exceeding .002 inch. Stainless steel and titanium materials have been used interchangeably for bodies, sleeves and tubing. Aluminum has also been used and other materials are permissible. From tests already conducted it is known that silver, aluminum, nickel, and copper in various thicknesses will successfully perform in accordance with the foregoing description. Very thin coatings of Teflon have given goods results when used as sealant and lubricant with titanium and stainless steel tube, sleeves and bodies.

In the foregoing description it has been pointed out that the tubing 10 and 11 to be connected does not have to have deep flares in its end portions as would be required in "so-called" conventional tube fittings. There is shown a tapering formation on the tubes, which taper may vary from 0 degrees to 2 degrees or more. Tapers from zero to 1.0 degree per side have been successfully employed. With zero degrees or near zero degrees taper the sleeves cannot be used as the forming die for the tubing to be connected since the sleeve must be placed further back on the tube to permit tube forming. This is a disadvantage in that the sleeve must be pressed on the slightly expanded tube and body with more sliding action than is desirable and this requires a higher force level. The more nearly optimum angle of taper is between about 0.5 degree to 1.0 degree.

In FIG. 8 there is shown a connection involving assembly of a structural rod 42 in a connection where the joining body 43 has a median flange 44 and opposite extensions 45 and 46 that are oppositely tapered, as described above for tubing connections. The end portion 47 of the rod is upset in a die to form a tapered surface 48 thereon which may substantially match the taper on body extension 46. A sleeve 49 formed with a flange 50 has an internal tapered surface 51 which can be used as the die for making the rod taper 48. Pressure applied on flanges 44 and 50 will assemble the parts or effect disassembly, depending on the direction of application. It is, of course, understood that surface plating can be used in this connection in like manner to that described before so that it does not have to be repeated here.

Use of the press-fit principle is not limited to fluid systems. The high grip forces attainable make it very attractive as a structural fastener for rods, and it has uses in combined fluid-structural systems.

It is understood that in some situations in fluid systems, the pressure is low enough that large assembly forces are not needed and in such cases the flanges 15 and 16 are not provided as assembly can be effected by force applied against the outer ends of the sleeves 13 and 14.

It should be emphasized that plating or coating of mating surfaces is not essential to successful performance of press-fittings. However, plating or coating on sleeve and body tapers has demonstrated desirable properties which indicate that it should be used in most applications.

While the foregoing disclosure has set forth certain preferred embodiments of the present invention, it is to be understood that modifications and changes in the components and parts herein described may occur to those skilled in the art after understanding the present disclosure. Dimensions, materials, tolerances and design details shown are typical, for illustration only, and may be varied as required for specific applications.

What is claimed is:

1. A press-fitted coupling connection including a body having at least one axially elongated tubular extension thereon and a projection adjacent said extension, a tubular element connected with said body in axial elongation thereof, said element having an end portion aligned with said extension in axial relationship, the end of said extension being in axial confronting alignment with the end of said tubular element, and sleeve means axially movable relative to said extension and end portion into a position circumferentially tightly gripping said end portion and said body extension simultaneously to seal and retain the same in assembly against internal forces tending to separate the same, said sleeve means having an internally tapered surface and said body extension having a substantially matching tapered configuration, and said element end portion in assembly being substantially conformed to the internal tapered surface in said sleeve means, and said sleeve means having a projection thereon spaced from said body projection, said projections being adapted to be engaged by compressive force means to axially move said sleeve relative to said body to effect assembly of both said end portion and said body extension within said sleeve means whereby said sleeve means engages and circumferentially compresses said body extension and said end portion of said tubular element.

2. The press-fitted connection set forth in claim 1 wherein coating material is interposed between the interior surface of said sleeve means and the surface on said end portion and body extension enclosed by said sleeve means, said coating material fusing between said surfaces under the stress of the circumferential grip exerted by said sleeve means.

3. The press-fitted connection set forth in claim 1 wherein said tapered surface in said sleeve means has a taper of the order of from about 0.5 degree to about 1.0 degree.

4. The press-fitted connection set forth in claim 1 wherein said body extension and matched end portion have tapered exterior surfaces of the order of from about 0.5 degree to about 1.0 degree.

5. In a press-fitted connection the improvement which includes a fluid conducting body having tubular projections thereon formed with outwardly convergent tapered outer surfaces, tubing having outwardly tapered end portions, the ends of said projections being in axial confronting alignment with the outer ends of said tubing, and sleeve means connecting said tubing end portions and said body projections, said sleeve means having interior tapered bores conforming substantially to said tapered outer surfaces and said tapered end portions and receiving said body projections and tubing tapered end portions in assembled relation, the taper between said tubing end portions and the tapered bores in said sleeve means serving to hold said tubing in said sleeve means, and said sleeve means being connected to said body projections through the axially slidable mating of said interior tapered bores and the tapered outer surface, said sleeve means circumferentially compressing said tubing end portions and body projections.

6. The improvement of claim 5 and including coating material interposed in the connection between said tapered surfaces, said coating material being substantially fused into place and mechanically bonded by the circumferential compressive force exerted between said sleeve on the outside and said tubing and body projections on the inside.

7. The improvement of claim 6 wherein the coating material is metallic.

8. The improvement of claim 5 wherein said tapered surfaces have a taper of the order of from about zero degrees to about three degrees.

9. In a three-piece press-fitted connection, the improvement of a body having an axially elongated extension with an external surface convergently tapered outwardly to a remote end, a member having an end portion with an external surface divergently tapered to an outer end thereon, the remote end of said extension and the outer end of said member being in axial confronting alignment a connecting sleeve axially elongated and having a one way tapered internal surface conforming substantially to said convergently and divergently tapered surfaces and axially slidably receiving and engaging both said tapered elongated body extension and tapered end portion on said member, said sleeve retaining said remote and outer ends in axial confronting alignment and circumferentially compressing about said body extension and end portion of said member.

References Cited

UNITED STATES PATENTS

| | | | |
|---|---|---|---|
| 260,874 | 7/1882 | Jones et al. | 285—370 X |
| 3,149,860 | 9/1964 | Hallesy | 285—18 |
| 3,287,034 | 11/1966 | Bragg | 285—382 X |
| 2,170,492 | 8/1939 | Baker | 29—525 |
| 2,855,666 | 10/1958 | Gleitz | 29—525 |
| 3,269,743 | 8/1966 | Barreca | 287—119 |

FOREIGN PATENTS

| | | |
|---|---|---|
| 825,766 | 12/1959 | Great Britain. |
| 745,930 | 11/1966 | Canada. |

THOMAS F. CALLAGHAN, Primary Examiner

U.S. Cl. X.R.

29—237, 525; 285—332, 417, 284